US009914862B2

(12) United States Patent
Kelch et al.

(10) Patent No.: US 9,914,862 B2
(45) Date of Patent: Mar. 13, 2018

(54) STRUCTURAL POLYURETHANE ADHESIVE

(71) Applicant: SIKA TECHNOLOGY AG, Baar (CH)

(72) Inventors: Steffen Kelch, Oberengstringen (CH); Wolfgang Roock, Appen (DE); Florian Ittrich, Pinneberrg (DE)

(73) Assignee: SIKA TECHNOLOGY AG, Baar (CH)

( * ) Notice: Subject to any disclaimer, the term of this patent is extended or adjusted under 35 U.S.C. 154(b) by 65 days.

(21) Appl. No.: 14/779,847

(22) PCT Filed: May 14, 2014

(86) PCT No.: PCT/EP2014/059895
§ 371 (c)(1),
(2) Date: Sep. 24, 2015

(87) PCT Pub. No.: WO2014/184270
PCT Pub. Date: Nov. 20, 2014

(65) Prior Publication Data
US 2016/0053147 A1    Feb. 25, 2016

(30) Foreign Application Priority Data

May 15, 2013   (EP) .................................... 13167922

(51) Int. Cl.
| | | |
|---|---|---|
| *C09J 175/12* | (2006.01) | |
| *C08G 18/10* | (2006.01) | |
| *C08G 18/12* | (2006.01) | |
| *C08G 18/66* | (2006.01) | |
| *C08G 18/79* | (2006.01) | |
| *C08G 18/48* | (2006.01) | |
| *C08G 18/20* | (2006.01) | |
| *C08G 18/72* | (2006.01) | |
| *C08G 18/32* | (2006.01) | |
| *C09J 5/00* | (2006.01) | |
| *C09J 175/08* | (2006.01) | |
| *B65D 81/32* | (2006.01) | |
| *B32B 17/06* | (2006.01) | |
| *B32B 37/12* | (2006.01) | |

(Continued)

(52) U.S. Cl.
CPC .............. *C09J 175/12* (2013.01); *B32B 7/12* (2013.01); *B32B 9/005* (2013.01); *B32B 15/04* (2013.01); *B32B 17/06* (2013.01); *B32B 27/18* (2013.01); *B32B 27/38* (2013.01); *B32B 37/12* (2013.01); *B32B 43/006* (2013.01); *C08G 18/10* (2013.01); *C08G 18/2081* (2013.01); *C08G 18/324* (2013.01); *C08G 18/4812* (2013.01); *C08G 18/4841* (2013.01); *C08G 18/4854* (2013.01); *C08G 18/724* (2013.01); *C08G 18/792* (2013.01); *C08G 18/797* (2013.01); *C09J 5/00* (2013.01); *C09J 175/08* (2013.01); *B32B 2037/1253* (2013.01); *B32B 2037/1269* (2013.01); *B32B 2255/26* (2013.01); *B32B 2260/04* (2013.01); *B32B 2311/00* (2013.01); *B32B 2315/02* (2013.01); *B32B 2315/08* (2013.01); *B32B 2363/00* (2013.01); *B32B 2398/00* (2013.01); *B65D 81/325* (2013.01); *C09J 2475/00* (2013.01); *C09J 2475/003* (2013.01)

(58) Field of Classification Search
CPC .... C08G 18/10; C08G 18/12; C08G 18/6685; C08G 18/797; C08G 18/4854; C08G 18/4812; C08G 18/324; C08G 18/2081; C08G 18/792; C08G 18/724; C08G 18/4841; B32B 37/12; B32B 43/006; B32B 15/04; B32B 7/12; B32B 17/06; B32B 2311/00; B32B 2260/04; B32B 2255/26; B32B 2037/1269; B32B 2037/1253; B32B 2398/00; B32B 2363/00; B32B 2315/08; B32B 2315/02; C09J 175/12; C09J 5/00; C09J 175/08
See application file for complete search history.

(56) References Cited

U.S. PATENT DOCUMENTS

| 5,254,199 A | 10/1993 | Stepanski et al. |
|---|---|---|
| 2009/0044907 A1 | 2/2009 | Tribelhorn et al. |
| 2013/0288060 A1 | 10/2013 | Pind et al. |

FOREIGN PATENT DOCUMENTS

| CN | 101151290 A | 3/2008 |
|---|---|---|
| CN | 101778877 A | 7/2010 |

(Continued)

OTHER PUBLICATIONS

Notification of Transmittal of Translation of the International Preliminary Report on Patentability (Forms PCT/IB/338, PCT/IB/373, and PCT/ISA/237) dated Nov. 26, 2015, by the International Bureau of WIPO in corresponding International Patent Application No. PCT/EP2014/059895. (8 pages).

(Continued)

*Primary Examiner* — Rabon Sergent
(74) *Attorney, Agent, or Firm* — Oliff PLC

(57) ABSTRACT

The present invention relates to a two-component polyurethane adhesive consisting of a polyol component and a polyisocyanate component, wherein the polyol component comprises a triol with a molar mass of 1,000 to 10,000 g/mol, a diol having two primary hydroxy groups and a molar mass of 60 to 150 g/mol, a poly(trimethylene oxide) diol or a poly(tetramethylene oxide) diol with a molar mass of 200 to 3,000 g/mol and an aliphatic polyamine. The adhesive is characterized by high early strength, a low temperature dependence of the mechanical properties, good adhesion and the possibility of controlled thermally induced release of adhesion.

22 Claims, 2 Drawing Sheets

(51) Int. Cl.
*B32B 15/04* (2006.01)
*B32B 27/18* (2006.01)
*B32B 9/00* (2006.01)
*B32B 7/12* (2006.01)
*B32B 27/38* (2006.01)
*B32B 43/00* (2006.01)

(56) References Cited

FOREIGN PATENT DOCUMENTS

| | | |
|---|---|---|
| EP | 0 504 681 A1 | 9/1992 |
| EP | 2 468 789 A1 | 6/2012 |
| WO | WO 2009/058420 A1 | 5/2009 |

OTHER PUBLICATIONS

International Search Report (PCT/ISA/210) dated Jul. 31, 2014, by the Japanese Patent Office as the International Searching Authority for International Application No. PCT/EP2014/059895.

Written Opinion (PCT/ISA/237) dated Jul. 31, 2014, by the Japanese Patent Office as the International Searching Authority for International Application No. PCT/EP2014/059895.

May 26, 2017 Office Action issued in Chinese Patent Application No. 201480020968.9.

Jan. 19, 2018 Office Action issued in Chinese Application No. 201480020968.9.

STRUCTURAL POLYURETHANE ADHESIVE

TECHNICAL FIELD

The invention relates to the field of two-component polyurethane adhesives, especially of viscoelastic structural polyurethane adhesives.

PRIOR ART

Two-component polyurethane adhesives based on polyols and polyisocyanates have been in use for long time. Two-component polyurethane adhesives have the advantage that they cure rapidly after mixing and therefore can absorb and transfer rather high forces after a short time. Great demands in terms of strength and adhesive force are imposed on such adhesives for use as structural adhesives, since adhesives of this type are elements of load-bearing structures.

In particular, adhesives are desired which have high strengths in terms of structural bonds and nevertheless have high extensibility over the broadest possible range of temperatures, combined with only a moderate temperature dependence of the mechanical properties. In addition, the adhesives should build up a certain amount of strength as quickly as possible, thus already be capable of load-bearing before they are cured, so that bonded parts can be moved at an early point or the apparatus holding the bond in place can be removed at an early point. This characteristic is also known as "high early strength." The adhesives should also be able to be cured to their final strength both at ambient temperature and in a thermally accelerated curing process and exhibit good adhesion to metal and nonmetal substrates.

In addition there is a need for adhesives that conform to the above-mentioned characteristics and also can be easily removed from the substrate using a specific treatment, or bonds based on cured adhesives that can be released without the substrate being damaged by this treatment, for example due to high mechanical or thermal stress.

PRESENTATION OF THE INVENTION

Figure 1:
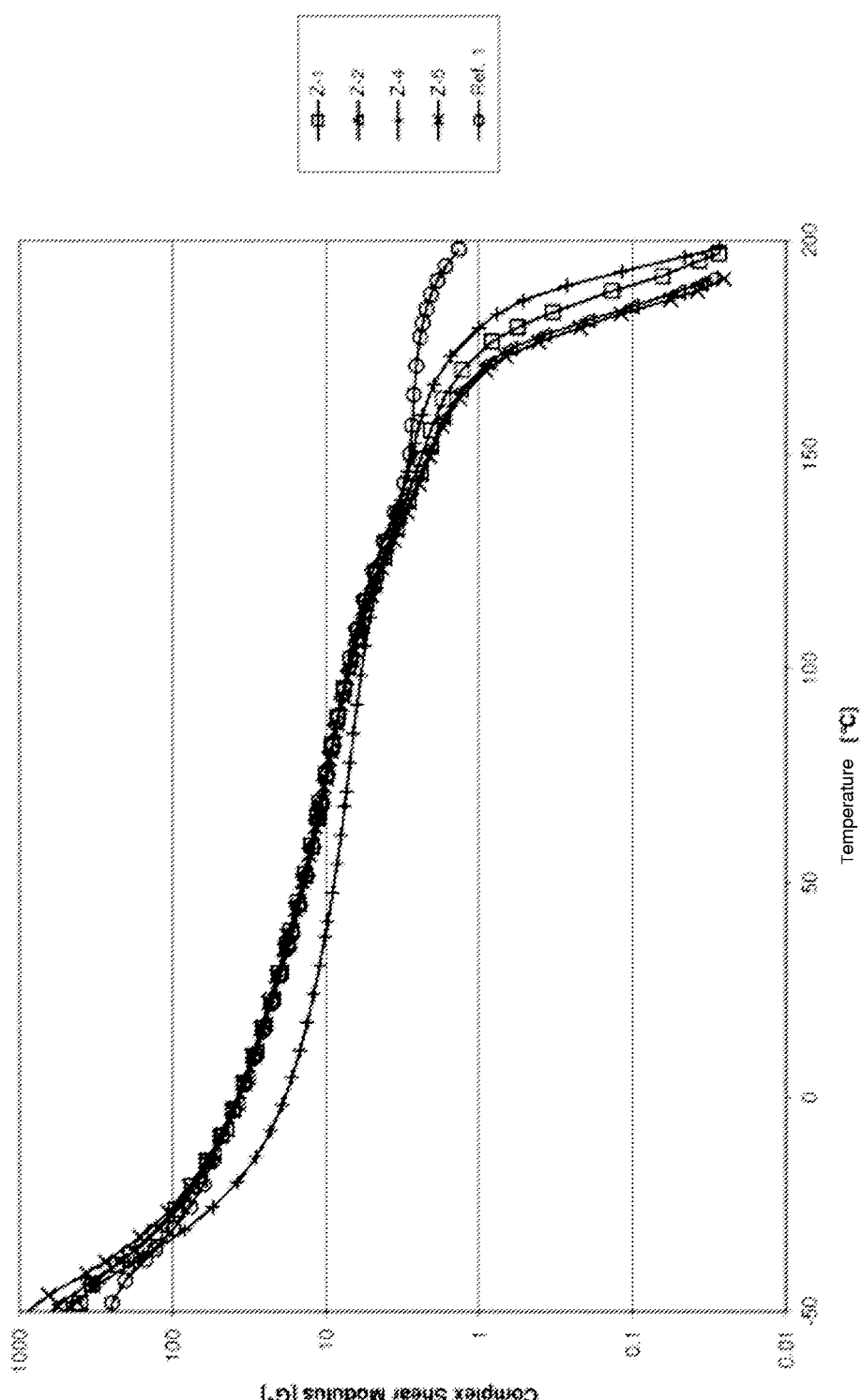
FIGS. 1 and 2 are DMTA measurements for examples according to the invention and a comparison example.

Object of the present invention therefore is to supply a two-component polyurethane adhesive which has high strength and high extensibility with only a modest dependence of the mechanical properties on the temperature and high early strength and is thus excellently suited as a structural adhesive.

Surprisingly this object is achieved with the polyurethane adhesive according to the invention. It was surprisingly found that the polyurethane adhesive according to the invention, because of the use of either a poly(trimethylene oxide) diol or a poly(tetramethylene oxide) diol as part of the polyol component has increased early strength and particularly good adhesion, especially to metal surfaces and glass fiber- or carbon fiber-reinforced plastics. This is manifested especially by high tensile shear strength values at an early time after bonding and high values for the tensile shear strength of fully cured adhesives. Surprisingly in addition, when a poly(trimethylene oxide) diol is used, a particularly low temperature dependence of the modulus of elasticity is observed.

In addition, the composition using a poly(trimethylene oxide) diol or a poly(tetramethylene oxide) diol allows for controlled thermal degradation of the adhesive upon application of a temperature of $\geq 120°$ C., in particular $140°$ C.-$200°$ C. for $\geq 10$ min, in particular $\geq 20$ min, which can be utilized as needed for controlled release of adhesion.

Additional aspects of the invention are the subjects of other independent claims. Particularly preferred embodiments of the invention are the subjects of the dependent claims.

WAYS OF IMPLEMENTING THE INVENTION

The present invention relates to a polyurethane adhesive consisting of a polyol component K1 and a polyisocyanate component K2; wherein
the polyol component K1 comprises
at least one triol A1 with an average molar mass in the range of 1,000 to 10,000 g/mol,
at least one diol A2 with two primary hydroxy groups and a molar mass in the range of 60 to 150 g/mol,
at least one diol A3 with an average molar mass in the range of 200 to 3,000 g/mol, which represents either a poly(trimethylene oxide) diol or a poly(tetramethylene oxide) diol, and
at least one aliphatic polyamine PA with a molar mass in the range of 60 to 500 g/mol; and
the polyisocyanate component K2 comprises
at least one polyisocyanate B1 and
at least one isocyanate group-containing polyurethane polymer B2;
wherein the triol A1, the diol A2 and the diol A3 are present in a quantity such that the weight ratio of (A1+A3)/A2 is in the range of 2.5 to 20, preferably 3 to 15, in particular 4 to 10, and the weight ratio of A1/A3 is in the range of 2 to 100, preferably 3 to 75, in particular 4 to 50.

The prefix "poly" in substance names such as "polyol," "polyisocyanate," "polyether" or "polyamine" in the present document indicates that the respective substance in terms of its formula contains more than one of the functional groups present in its name.

"Molar mass" is defined in the present document as the molar mass (in g per mole) of a molecule. The "average molar mass" is defined as the number-average molar mass $M_n$ of an oligomeric or polymeric mixture of molecules and is usually determined by GPC versus a polystyrene standard.

A "primary hydroxy group" is the term designating an OH group that is bound to a C atom having two hydrogens.

The term "open time" in this document means the time within which the parts to be bonded must be joined together after the components are mixed.

The term "strength" in the present document designates the strength of the cured adhesive, wherein strength means in particular the tensile strength and the modulus of elasticity (E-modulus), in particular in the elongation range of 0.05 to 0.25%.

"Release of adhesion" in an adhesive bond in the present document is defined as the controlled weakening of the adhesive with regard to its strength. This allows for mechanical separation of the substrates with application of relatively little force, i.e., the adhesive bond can be readily released. The separation may take place either adhesively between the adhesive and a substrate surface or cohesively within the adhesive.

"Room temperature" in the present document designates a temperature of $23°$ C.

A suitable triol A1 is, in particular, a polyoxyalkylene triol, also called a polyether triol. These are polymerization products of ethylene oxide, 1,2-propylene oxide, 1,2- or 2,3-butylene oxide or mixtures thereof. They are typically polymerized using a starter molecule with three active hydrogen atoms such as glycerol, 1,1,1-trimethylol ethane, 1,1,1-trimethylol propane or mixtures thereof.

Preferred triols A1 are polyoxypropylene triols, polyoxyethylene triols and polyoxypropylene-polyoxyethylene triols.

Particularly preferably the triol A1 has primary hydroxy groups, most preferably exclusively primary hydroxy groups.

Particularly preferred as the triol A1 are so-called "EO-endcapped" (ethylene oxide-endcapped) polyoxypropylene triols. These are special polyoxypropylene-polyoxyethylene triols, obtained for example by further alkoxylating pure polyoxypropylene triols with ethylene oxide after polypropoxylation is complete and thus having primary hydroxy groups. Compared with pure polyoxyethylene triols they have the advantage that they are less hydrophilic and are liquid at room temperature.

The triol A1 preferably has a mean OH functionality in the range of 2.2 to 3. With such triols A1, adhesives with good mechanical properties are obtained.

The trial A1 preferably has an average molar mass in the range of 3,000 to 8,000 g/mol, particularly preferably of 4,000 to 6,000 g/mol, most preferably of 4,500 to 5,000 g/mol. Such a triol has a good combination of high functionality and chain length, so that an adhesive with good mechanical properties is obtained.

The triol A1 is preferably used in a quantity of 30 to 60 wt.-% based on the total weight of the polyol component K1.

The polyol component K1 also comprises one or more diols A2 with two primary hydroxy groups and a molar mass in the range of 60 to 150 g/mol. Diols with a molar mass of more than 150 g/mol result in distinctly lower strengths in the cured state.

The diol A2 is preferably used in a quantity of 2 to 15 wt.-% based on the polyol component K1.

Particularly suitable diols A2 are 1,2-ethanediol, 1,3-propanediol, 1,4-butanediol, 1,5-pentanediol, 1,6-hexanediol, 1,3-cyclohexane dimethanol, 1,4-cyclohexane dimethanol and diethylene glycol. These diols have primary hydroxy groups that exhibit little steric hindrance but are highly reactive with isocyanate groups.

Particularly preferably the diol A2 is a linear dial, in particular selected from the group consisting of 1,3-propanediol, 1,4-butanediol and 1,5-pentanediol. These diols are particularly easy to manage, since they have very low hydrophilicity and are liquid at room temperature, and during curing of the adhesive they form chain segments rich in urethane bonds, which promotes high strengths with good extensibility over a broad range of temperatures. Particularly preferred among these are 1,4-butanediol and 1,5-pentanediol, and most particularly preferred is 1,4-butanediol.

The polyol component K1 also comprises one or more diols A3 with an average molar mass in the range of 200 to 3,000 g/mol, which is either a poly(trimethylene oxide) diol or a poly(tetramethylene oxide) diol.

Such diols A3 are advantageous in that the adhesive thus attains low temperature dependence of mechanical properties at temperatures from −35° C. to 85° C., particularly in terms of the modulus of elasticity, the tensile strength and the elongation at break, and especially in the totality of these properties. In addition, such diols A3 are conducive to high tensile shear strength at an early time point after bonding, in particular after 1 to 5 hours, preferably after 3 hours.

The diol A3 preferably has an average molar mass in the range of 800 to 2,200 g/mol. Particularly high elongations at high strength are obtained with such a diol A3.

In one embodiment of the invention the diol A3 is preferably a poly(trimethylene oxide) diol. This is advantageous in that the adhesive has a particularly low temperature dependence of the modulus of elasticity.

A suitable poly(trimethylene oxide) diol preferably consists of ≥90 wt.-%, in particular ≥95 wt.-%, of a polymerization product of oxetane or a polycondensation product of 1,3-propanediol. Such poly(trimethylene oxide) diols can be produced, in particular, by polycondensation, in particular acid-catalyzed polycondensation, of 1,3-propanediol or by ring-opening polymerization of oxetane, in particular cationic ring-opening polymerization of oxetane.

Preferably the poly(trimethylene oxide) diol is a poly(trimethylene oxide) diol of formula (I),

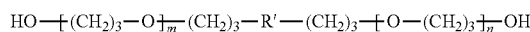

(I)

wherein m and n in each case independently of one another are 1 to 30 and are selected such that the poly(trimethylene oxide) diol has an average molar mass in the range of 200 to 3,000 g/mol, in particular 800 to 2,200 g/mol, and R' is an organic polyol having two OH groups, in particular two primary OH groups, following removal of the two OH groups, preferably selected from the group consisting of 1,3-propanediol, 1,4-butanediol and ethylene glycol, in particular 1,3-propanediol or ethylene glycol, most preferably 1,3-propanediol.

In an additional embodiment of the invention the diol A3 preferably represents a poly(tetramethylene oxide) diol. This is advantageous in that the adhesive has particularly high early strength, which is especially manifested in high values for the tensile shear at an early time point after bonding.

A suitable poly(tetramethylene oxide) diol preferably consists of ≥90 wt.-%, in particular ≥95 wt.-%, of a polymerization product of tetrahydrofuran or a polycondensation product of 1,4-butanediol. Such poly(tetramethylene oxide) diols can for example be produced by polycondensation, in particular acid-catalyzed polycondensation, of 1,4-butanediol or by ring-opening polymerization of tetrahydrofuran.

Preferably the poly(tetramethylene oxide) diol is a poly(tetramethylene oxide) diol of formula (II),

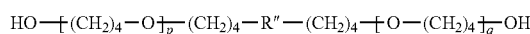

(II)

wherein p and q in each case independently of one another represent 1 to 20 and are selected such that the poly(tetramethylene oxide) diol has an average molar mass in the range of 200 to 3,000 g/mol, in particular 800 to 2,200 g/mol, and R" represents an organic polyol having two OH groups, in particular two primary OH groups, following removal of the two OH groups, preferably selected from the list consisting of 1,3-propanediol, 1,4-butanediol and ethylene glycol, in particular 1,4-butanediol and ethylene glycol, most preferably 1,4-butanediol.

Advantageously the fraction of diol A3 amounts to 0.5 to 20 wt.-%, preferably 1 to 15 wt.-%, in particular 1 to 10 wt.-%, based on the polyol component K1.

The triol A1, the diol A2 and the diol A3 are present in the adhesive in such a quantity that the weight ratio (A1+A3)/A2 is in the range of 2.5 to 20. An adhesive of this type has high strength with high extensibility and a low dependence of the modulus of elasticity on the temperature. Preferably the weight ratio of (A1+A3)/A2 falls in the range of 3 to 15, in particular in the range of 4 to 10. In an adhesive of this type the values for the extensibility lie in an especially interesting range for use as a structural adhesive.

The triol A1 and the diol A3 are present in the adhesive in such a quantity that the weight ratio A1/A3 falls in the range of 2 to 100, preferably 3 to 75, in particular 4 to 50.

If the diol A3 is a poly(trimethylene oxide) diol, this weight ratio A1/A3 is particularly conducive to a temperature-independent modulus of elasticity.

If the diol A3 is a poly(tetramethylene oxide) diol, this weight ratio A1/A3 is particularly conducive to a high tensile shear strength in the cured state at low temperatures and at room temperature.

The polyol component K1 also comprises at least one aliphatic polyamine PA with a molar mass in the range of 60 to 500 g/mol, preferably 60 to 240 g/mol.

Amines suitable as the aliphatic polyamines PA are amines having two or three aliphatic amino groups, in particular the following commercially available polyamines:

aliphatic, cycloaliphatic or arylaliphatic primary diamines, such as in particular ethylenediamine, 1,2-propanediamine, 1,3-propanediamine, 2-methyl-1,2-propanediamine, 2,2-dimethyl-1,3-propanediamine, 1,3-butanediamine, 1,4-butanediamine, 1,3-pentanediamine (DAMP), 1,5-pentanediannine, 1,5-diamino-2-methylpentane (MPMD), 2-butyl-2-ethyl-1,5-pentanediamine (C11-neodiamine), 1,6-hexanediamine, 2,5-dimethyl-1,6-hexanediamine, 2,2,4- and 2,4,4-trimethylhexamethylenediamine (TMD), 1,7-heptanediamine, 1,8-octanediamine, 1,9-nonanediamine, 1,10-decanediamine, 1,11-undecanediamine, 1,12-dodecanediamine, 1,2-, 1,3- and 1,4-diaminocyclohexane, 1,4-diamino-2,2,6-trimethylcyclohexane (TMCDA), bis-(4-aminocyclohexyl)-methane ($H_{12}$-MDA), bis-(4-amino-3-methylcyclohexyl)-methane, bis-(4-amino-3-ethylcyclohexyl)-methane, bis-(4-amino-3,5-dimethylcyclohexyl)-methane, bis-(4-amino-3-ethyl-5-methylcyclohexyl)-methane (M-MECA), 1-amino-3-aminomethyl-3,5,5-trimethylcyclohexane (=isophoronediamine or IPDA), 2- and 4-methyl-1,3-diaminocyclohexane and mixtures thereof, 1,3- and 1,4-bis-(aminomethyl)cyclohexane, 2,5(2,6)-bis-(aminomethyl)-bicyclo[2.2.1]heptane (NBDA), 3(4),8(9)-bis-(aminomethyl)-tricyclo[5.2.1.0$^{2,6}$]decane, 1,8-menthanediamine and 1,3- and 1,4-bis-(aminomethyl)benzene;

ether group-containing aliphatic primary diamines, such as in particular bis-(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 4,7,10-trioxatridecane-1,13-diamine and higher oligomers of these diamines, 3,9-bis-(3-aminopropyl)-2,4,8,10-tetraoxaspiro[5.5]undecane, bis-(3-aminopropyl)polytetrahydrofurans and other polytetrahydrofuran diamines, Jeffamine® RFD-270 (from Huntsman), as well as polyoxyalkylene diamines ("polyether-diamines"). The latter are products form the amination of polyoxyalkylene diols and are available, for example, under the name of Jeffamine® (from Huntsman), under the name of Polyetheramine (from BASF) or under the name of PC Amine® (from Nitroil). Especially suitable polyoxyalkylene diamines are Jeffamine® D-230, Jeffamine® D-400, Polyetheramine D 230, Polyetheramine D 400, PC Amine® DA 250 and PC Amine® DA 400; and polyoxyalkylenetriamines ("polyether-triamines"), which are products from the amination of polyoxyalkylentriols and are available, for example, under the trade name of Jeffamine® (from Huntsman), under the name of Polyetheramine (from BASF) or under the name of PC Amine® (from Nitroil), in particular Jeffamine® T-403, Polyetheramine T403, and PC Amine® TA 403.

Particularly preferably the polyamine PA is selected from the group consisting of 1,5-diamino-2-methylpentane, 2,2,4- and 2,4,4-trimethylhexamethylene diamine, 1,8-octanediamine, 1,10-decanediamine, 1,12-dodecanediamine, 1-amino-3-aminomethyl-3,5,5-trimethylcyclohexane, 2- and 4-methyl-1,3-diaminocyclohexane and mixtures thereof, 1,3-bis-(aminomethyl)cyclohexane, 1,4-bis-(aminomethyl)cyclohexane, 2,5(2,6)-bis-(aminomethyl)-bicyclo[2.2.1]heptane, 3(4),8(9)-bis-(aminomethyl)-tricyclo[5.2.1.0$^{2,6}$]decane, bis-(2-aminoethyl)ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 1,3-bis-(aminomethyl)benzene and 1,4-bis-(aminomethyl)benzene.

These polyamines are particularly accessible and, in a very rapid reaction with isocyanates, lead to urea groups which very efficiently form a network based on hydrogen bonds, resulting in a rapid rise in the viscosity, and thus can effectively prevent run-off of the adhesive from the substrate. Adhesives produced with these have especially high strengths, especially high moduli of elasticity, and little dependency of mechanical properties on the temperature.

Preferred are 1,3-bis-(aminomethyl)cyclohexane and 1,3-bis-(aminomethyl)benzene, most preferably 1,3-bis-(aminomethyl)benzene. With these polyamines, cured adhesives with particularly high strengths are obtained.

The aliphatic polyamine PA is preferably used in a quantity of 0.1 to 3 wt.-% based on the total weight of the polyol component K1. Such an adhesive is particularly easy to process. It displays non-sag properties rapidly without the open time being too short.

A particularly preferred polyurethane adhesive contains a polyol component K1, comprising at least one triol A1 with an average molar mass in the range of 1,000 to 10,000 g/mol, in particular 3,000-8,000 g/mol, preferably in a quantity of 30 to 60 wt.-%, wherein this particularly involves a so-called "EO-endcapped" (ethylene oxide-endcapped) polyoxypropylene triol;

at least one diol A2 having two primary hydroxy groups and a molar mass in the range of 60 to 150 g/mol, preferably in a quantity of 2 to 15 wt.-%, wherein this is preferably 1,4-butanediol or 1,5-pentanediol;

at least one diol A3 with an average molar mass in the range of 200 to 3,000 g/mol, in particular 800 to 2,200 g/mol, which is either a poly(trimethylene oxide) diol or a poly(tetramethylene oxide) diol, preferably in a quantity of 0.5 to 20 wt.-%; and at least one aliphatic polyamines PA with a molar mass in the range of 60 to 500 g/mol, preferably in a quantity of 0.1 to 3 wt.-%, wherein this is preferably an aliphatic polyamine selected from the group consisting of 1,5-diamino-2-methylpentane, 2,2,4- and 2,4,4-trimethyl-hexamethylene diamine, 1,8-octane diamine, 1,10-decane diamine, 1,12-dodecane diamine, 1-amino-3-aminomethyl-3,5,5-trimethylcyclohexane, 2- and 4-methyl-1,3-diaminocyclohexane and mixtures thereof, 1,3-bis-(aminomethyl)cyclohexane, 1,4-bis-(amino-methyl)cyclohexane, 2,5(2,6)-bis-(aminomethyl)-bicyclo[2.2.1]heptane, 3(4),8(9)-bis-(aminomethyl)-tricyclo[5.2.1.0$^{2,6}$]decane, bis-(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 1,3-bis-(aminomethyl)-benzene and 1,4-bis-(aminomethyl)benzene;

wherein the weight ratio of (A1+A3)/A2 is in the range of 2.5 to 20, preferably 3 to 15, in particular 4 to 10;

and the weight ratio of A1/A3 is preferably in the range of 2 to 100, preferably 3 to 75, in particular 4 to 50.

In these cases the weight-percentages are based on the total polyol component K1.

The polyisocyanate component K2 comprises at least one polyisocyanate B1.

Suitable polyisocyanates B1 are in particular monomeric di- or triisocyanates, as well as oligomers, polymers and derivatives of monomeric di- or triisocyanates and any mixtures thereof.

Suitable aromatic monomeric di- or triisocyanates are in particular 2,4- and 2,6-toluene diisocyanate and any mixtures of these isomers (TDI), 4,4'-, 2,4'- and 2,2'-diphenylmethane diisocyanate and any mixtures of these isomers (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), dianisidine diisocyanate (DADI), 1,3,5-tris-(isocyanatomethyl)benzene, tris-(4-isocyanatophenyl)methane und tris-(4-isocyanatophenyl)thiophosphate.

Suitable aliphatic monomeric di- or triisocyanates are in particular 1,4-tetramethylene diisocyanate, 2-methylpentamethylene-1,5-diisocyanate, 1,6-hexamethylene diisocyanate (HDI), 2,2,4-und 2,4,4-trimethyl-1,6-hexamethylene diisocyanate (TMDI), 1,10-decamethylene diisocyanate, 1,12-dodecamethylene diisocyanate, lysine and lysine ester diisocyanates, cyclohexane-1,3- and -1,4-diisocyanate, 1-methyl-2,4- and -2,6-diisocyanatocyclohexane and any mixtures of these isomers (HTDI or H$_6$TDI), 1-isocyanato-3,3,5-trimethyl-5-isocyanatomethyl-cyclohexane (=isophorone diisocyanate or IPDI), perhydro-2,4'- and -4,4'-diphenylmethane diisocyanate (HMDI or H$_{12}$MDI), 1,4-diisocyanato-2,2,6-trimethylcyclohexane (TMCDI), 1,3- and 1,4-bis-(isocyanatomethyl)cyclohexane, m- and p-xylylene diisocyanate (m- and p-XDI), m- and p-tetramethyl-1,3- and -1,4-xylylene diisocyanate (m- and p-TMXDI), bis-(1-isocyanato-1-methylethyl) naphthalene, dimeric and trimeric fatty acid isocyanates such as 3,6-bis-(9-isocyanatononyl)-4,5-di-(1-heptenyl)cyclohexene (dimeryl diisocyanate) and α,α,α',α',α'',α''-hexamethyl-1,3,5-mesitylene triisocyanate.

Suitable oligomers, polymers and derivatives of the named monomeric di- and triisocyanates are in particular derived from MDI, TDI, HDI and IPDI. Particularly suitable among these are commercially available types, in particular HDI biurets such as Desmodur® N 100 and N 3200 (from Bayer), Tolonate® HDB and HDB-LV (from Rhodia) and Duranate® 24A-100 (from Asahi Kasei); HDI isocyanurates, such as Desmodur® N 3300, N 3600 and N 3790 BA (all from Bayer), Tolonate® HDT, HDT-LV and HDT-LV2 (from Rhodia), Duranate® TPA-100 and THA-100 (from Asahi Kasei) and Coronate® HX (from Nippon Polyurethane); HDI-uretdiones such as Desmodur® N 3400 (from Bayer); HDI-iminooxadiazine diones such as Desmodur® XP 2410 (from Bayer); HDI-allophanates such as Desmodur® VP LS 2102 (from Bayer); IPDI-isocyanurates, for example in solution as Desmodur® Z 4470 (from Bayer) or in solid form as Vestanat® T1890/100 (from Degussa); TDI-oligomers such as Desmodur® IL (from Bayer); and mixed isocyanurates based on TDI/HDI, for example such as Desmodur® HL (from Bayer). Also particularly suitable are forms of MDI that are liquid at room temperature (so-called "modified MDI"), which represent mixtures of MDI with MDI derivatives, in particular MDI carbodiimides or MDI uretoneimines or MDI-urethanes, known under trade names such as Desmodur® CD, Desmodur® PF, Desmodur® PC (all from Bayer) or Isonate® M 143 (from Dow), as well as mixtures of MDI and MDI homologs (polymeric MDI or PMDI), available under trade names such as Desmodur® VL, Desmodur® VL50, Desmodur® VL R10, Desmodur® VL R20, Desmodur® VH 20 N and Desmodur® VKS 20F (all from Bayer), Isonate® M 309, Voranate® M 229 and Voranate® M 580 (all from Dow) or Lupranat® M 10 R (from BASF). The above-named oligomeric polyisocyanates in practice are usually mixtures of substances with different degrees of oligomerization and/or chemical structures. Advantageously they have a mean NCO functionality of 2.1 to 4.0.

Preferred polyisocyanates B1 are forms of MDI that are liquid at room temperature. These are in particular so-called polymeric MDI and MDI containing fractions of oligomers or derivatives thereof. The content of MDI (=4,4'-, 2,4'- or 2,2'-diphenylmethane diisocyanate and any mixtures of these isomers) of such liquid forms of MDI is in particular 50 to 95 wt.-%, in particular 60 to 90 wt.-%.

Particularly preferred as polyisocyanates B1 are polymeric MDI and especially MDI types that are liquid at room temperature, which contain fractions of MDI carbodiimides or adducts thereof.

Particularly good processing properties and especially high strengths are achieved with these polyisocyanates B1.

The polyisocyanate component K2 also comprises one or more isocyanate group-containing polyurethane polymer B2.

The polyurethane polymer B2 preferably contains 50 to 95 mass-percent, in particular 70 to 90 mass-percent, polyoxyalkylene units, particularly preferably polyoxyethylene and/or polyoxypropylene units, in particular polyoxypropylene units. A polyurethane polymer of this type has a low viscosity and enables good extensibility.

The polyurethane polymer B2 preferably has an average molar mass in the range of 1,000 to 20,000 g/mol, particularly preferably 2,000 to 10,000 g/mol.

The polyurethane polymer B2 preferably has an average NCO functionality in the range of 1.7 to 3, in particular of 1.8 to 2.5. Polyurethane polymers of this type allow for good processing properties and good mechanical properties in the cured state.

Particularly preferably the polyurethane polymer B2 has a mean NCO functionality in the range of 2.05 to 2.5. Polyurethane polymers of this type enables especially good extensibility with high strength.

The polyurethane polymer B2 preferably has a free isocyanate group content of 1 to 10 wt.-%, particularly preferably of 1 to 5 wt.-%.

A suitable isocyanate group-containing polyurethane polymer B2 can be obtained from the reaction of at least one polyisocyanate with at least one polyol. This reaction can take place in that the polyol and the polyisocyanate are reacted using conventional methods, for example at temperatures of 50° C. to 100° C., optionally with simultaneous use of suitable catalysts, wherein the polyisocyanate is added in a quantity such that the isocyanate groups thereof are present in stoichiometric excess relative to the hydroxy groups of the polyol. Advantageously the polyisocyanate is added in a quantity such that an NCO/OH ratio of 1.3 to 5, in particular one of 1.5 to 3, is maintained. The "NCO/OH ratio" is defined as the ratio of the number of isocyanate groups used to the number of hydroxy groups used.

Suitable polyols for producing a polyurethane polymer B2 are in particular the following commercially available polyols or mixtures thereof:

Polyoxyalkylene polyols, also known as polyether polyols or oligoetherols, which are polymerization products of ethylene oxide, 1,2-propylene oxide, 1,2- or 2,3-butylene oxide, oxetane, tetrahydrofuran or mixtures thereof, possibly polymerized using a starter molecule having two or more active hydrogen atoms such as water, ammonia or compounds with several OH or NH groups, for example 1,2-ethanediol, 1,2- and 1,3-propanediol, neopentyl glycol, diethylene glycol, triethylene glycol, the isomeric dipropylene glycols and tripropylene glycols, the isomeric butanediols, pentanediols, hexanediols, heptanediols, octanediols, nonanediols, decanediols, undecanediols, 1,3- and 1,4-cyclohexane dimethanol, bisphenol A, hydrogenated bisphenol A, 1,1,1-trimethylol ethane, 1,1,1-trimethylol propane, glycerol, aniline, and mixtures of the above-named compounds. Both polyoxyalkylene polyols, which have a low degree of unsaturation (measured according to ASTM D-2849-69 and reported in milliequivalents of unsaturation per gram of polyol (mEq/g)), produced for example using so-called Double Metal Cyanide Complex catalysts (DMC catalysts), and polyoxyalkylene polyols with a higher degree of unsaturation, produced for example with the aid of anionic catalysts such as NaOH, KOH, CsOH or alkali alcoholates, may be used.

Particularly suitable are polyoxyalkylene diols or polyoxyalkylene triols, in particular polyoxyethylene and polyoxypropylene diols and triols.

Very particularly suitable are polyoxyalkylene diols and triols with a degree of unsaturation less than 0.02 mEq/g and with a molar mass in the range of 1,000-30,000 g/mol, as well as polyoxypropylene diols and triols with a molar mass of 400-8,000 g/mol.

Especially suitable are so-called ethylene oxide-terminated ("EO-endcapped," ethylene oxide-endcapped) polyoxypropylene polyols.

Styrene-acrylonitrile- or acrylonitrile-methyl methacrylate-grafted polyether polyols.

Polyester polyols, also known as oligoesterols produced by known methods, in particular polycondensation of hydroxycarboxylic acids or polycondensation of aliphatic and/or aromatic polycarboxylic acids with dihydric or polyhydric alcohols.

Particularly suitable polyester polyols are those made from di- to trihydric, especially dihydric, alcohols, for example ethylene glycol, diethylene glycol, propylene glycol, dipropylene glycol, neopentyl glycol, 1,4-butanediol, 1,5-pentanediol, 3-methyl-1,5-hexanediol, 1,6-hexanediol, 1,8-octanediol, 1,10-decanediol, 1,12-dodecanediol, 1,12-hydroxystearyl alcohol, 1,4-cyclohexanedimethanol, dimer fatty acid diol (dimer diol), hydroxypivalic acid neopentyl glycol ester, glycerol, 1,1,1-trimethylolpropane or mixtures of the above-named alcohols, with organic di- or tricarboxylic acids, in particular dicarboxylic acids, or the anhydrides or esters thereof, for example succinic acid, glutaric acid, adipic acid, trimethyladipic acid, suberic acid, azelaic acid, sebacic acid, dodecanedicarboxylic acid, maleic acid, fumaric acid, dimer fatty acid, phthalic acid, phthalic anhydride, isophthalic acid, terephthalic acid, dimethyl terephthalate, hexahydrophthalic acid, trimellitic acid and trimellitic acid anhydride, or mixtures of the above-named acids, as well as polyester polyols prepared from lactones, for example from ε-caprolactone and starters such as the above-named di- or trihydric alcohols. Particularly suitable polyester polyols are polyester diols.

Polycarbonate polyols, such as those that can be obtained by reacting the above-named alcohols—used in producing the polyester polyols—with di-alkyl carbonates, diaryl carbonates or phosgene.

Block copolymers having at least two hydroxy groups which have at least two different blocks with polyether, polyester and/or polycarbonate structure of the above-described type, in particular polyether polyester polyols.

Polyacrylate and polymethacrylate polyols.

Polyhydroxy-functional fats and oils, for example natural fats and oils, especially castor oil, or polyols obtained by chemical modification of natural fats and oils—so-called oleochemical polyols—for example the epoxy polyesters or epoxy polyethers obtained by epoxidation of unsaturated oils and subsequent ring opening with carboxylic acids or alcohols, or polyols obtained by hydroformylation and hydrogenation of unsaturated oils; or polyols obtained from natural fats and oils by degradation processes such as alcoholysis or ozonolysis followed by chemical linking, for example by transesterification or dimerization, of the degradation products or derivatives thereof obtained in this way. Suitable degradation products of natural fats and oils are in particular fatty acids and fatty alcohols as well as fatty acid esters, in particular the methyl esters (FAME), which can be derivatized to hydroxy fatty acid esters for example by hydroformylation and hydrogenation.

Polyhydrocarbon polyols, also known as oligohydrocarbonols, for example polyhydroxy-functional polyolefins, polyisobutylene, polyisoprene; polyhydroxy-functional ethylene-propylene-, ethylene-butylene- or ethylene-propylene-diene copolymers, such as are manufactured for example by the Kraton Polymers company; polyhydroxyfunctional polymers of dienes, in particular of 1,3-butadiene, which in particular can also be produced by anionic polymerization; polyhydroxy-functional copolymers from dienes such as 1,3-butadiene or diene mixtures and vinyl monomers such as styrene, acrylonitrile, vinyl chloride, vinyl acetate, vinyl alcohol, isobutylene and isoprene, for example polyhydroxy-functional acrylonitrile/butadiene copolymers such as can be produced for example from epoxides or amino alcohols and carboxyl-terminated acrylonitrile/butadiene copolymers (commercially available, for example, under the name of Hypro®

(previously Hycar®), CTBN and CTBNX and ETBN from Nanoresins AG, Germany, or Emerald Performance Materials LLC); and hydrogenated polyhydroxy-functional polymers or copolymers of dienes.

Preferred polyols for producing a polyurethane polymer B2 are polyoxyalkylene polyols, polyester polyols, polycarbonate polyols and polyacrylate polyols. Particularly preferred are polyoxyalkylene polyols, in particular polyoxypropylene polyols and polyoxyethylene-polyoxypropylene mixed polyols.

The polyol for producing a polyurethane polymer B2 preferably has an average molar mass in the range of 500 to 20,000 g/mol, in particular 1,000 to 8,000 g/mol.

The polyol for producing a polyurethane polymer B2 is preferably a diol or a mixture of at least one diol and at least one triol, in particular a mixture of at least one diol and at least one triol.

Suitable polyisocyanates for producing a polyurethane polymer B2 are in particular the following commercially available polyisocyanates or mixtures thereof:

2,4- and 2,6-toluene diisocyanate and any mixtures of these isomers (TDI), 4,4'-, 2,4'- and 2,2'-diphenylmethane diisocyanate and any mixtures of these isomers (MDI), 1,3- and 1,4-phenylene diisocyanate, 2,3,5,6-tetramethyl-1,4-diisocyanatobenzene, naphthalene-1,5-diisocyanate (NDI), 3,3'-dimethyl-4,4'-diisocyanatodiphenyl (TODI), 1,3,5-tris-(isocyanatomethyl)benzene, 2-methylpentamethylene-1,5-diisocyanate, 1,6-hexamethylene diisocyanate (HDI), 2,2,4- and 2,4,4-trimethyl-1,6-hexamethylene diisocyanate (TMDI), 1,10-decamethylene diisocyanate, 1,12-dodecamethylene diisocyanate, lysine and lysine ester diisocyanates, cyclohexane-1,3- and -1,4-diisocyanates, 1-methyl-2,4- and -2,6-diisocyanato-cyclohexane and any mixtures of these isomers (HTDI or $H_6$TDI), 1-isocyanato-3,3,5-trimethyl-5-isocyanatomethyl-cyclohexane (=isophorone diisocyanate or IPDI), perhydro-2,4'- and -4,4'-diphenylmethane diisocyanate (HMDI or $H_{12}$MDI), 1,4-diisocyanato-2,2,6-trimethyl-cyclohexane (TMCDI), 1,3- and 1,4-bis-(isocyanatomethyl)-cyclohexane, m- and p-xylylene diisocyanate (m- and p-XDI) and m- and p-tetramethyl-1,3- and -1,4-xylylene diisocyanate (m- and p-TMXDI). MDI, TDI, IPDI and HDI are preferred. MDI is particularly preferred.

Most preferred is 4,4'-diphenylmethane diisocyanate.

Advantageously the isocyanate group-containing polyurethane polymer B2 can be obtained from the reaction of 4,4'-diphenylmethane diisocyanate with at least one polyol. On curing of the adhesive, particularly effective hard segments, those with particularly high strength, are obtained with this.

Preferably the polyisocyanate B1 and the polyisocyanate used for producing the polyurethane prepolymer B2 are different types of polyisocyanates.

Particularly preferably the polyisocyanate B1 is a MDI that is liquid at room temperature and the polyisocyanate used for producing the polyurethane polymer B2 is 4,4'-diphenylmethane diisocyanate, which is typically solid at room temperature. Thus the second component is liquid at room temperature, which enables easy processing, and particularly good mechanical properties are achieved. A defined mixture of polyisocyanate B1 and polyurethane polymer B2 can be obtained in that the polyurethane polymer B2 is first produced separately before it is mixed with the polyisocyanate B1.

Thus preferably the preparation of the polyurethane polymer B2 does not take place in the presence of the polyisocyanate B1.

Preferably the weight ratio between the polyisocyanate B1 and the polyurethane polymer B2 is 0.25 to 4, preferably 0.25 to 2, particularly preferably 0.3 to 1.5, and in particular 0.4 to 1.0. A polyisocyanate component K2 of this type enables adhesives with good processability, high strength and high elongation.

A particularly preferred polyurethane adhesive contains a polyisocyanate component K2, comprising
20 to 60 wt.-% of at least one polyisocyanate B1, wherein this is preferably a form of 4,4'-, 2,4'- or 2,2'-diphenylmethane diisocyanate that is liquid at room temperature and mixtures of these isomers (MDI) in the form of polymeric MDI or MDI with fractions of oligomers or derivatives, and
30 to 70 wt.-% of one or more isocyanate groups containing polyurethane polymer B2, the urethane groups and free isocyanate groups thereof are preferably derived from 4,4'-diphenylmethane diisocyanate.

The weight percentages mentioned are based on the total polyisocyanate component K2.

The polyurethane adhesive can additionally contain as a constituent of the polyol component K1 further substances reactive with isocyanate groups. In particular, the polyol component K1 may contain one or more polyols and/or one or more low-molecular-weight dihydric or polyhydric alcohols that were mentioned for producing the polyurethane polymer B2.

In addition, the polyurethane adhesive can contain catalysts that accelerate the reaction of hydroxy groups with isocyanate groups, in particular tin, zinc and bismuth-containing organometallic catalysts, for example dibutyltin dilaurate, or tertiary amines, amidines or guanidines, for example 1,4-diazabicyclo[2.2.2]octane (DABCO) or 1,8-diazabicyclo[5.4.0]undec-7-ene (DBU). To achieve thermal activation, in particular the tertiary amines, amidines or guanidines can reversibly form a salt with phenol or carboxylic acids, in particular phenolic or other aromatic carboxylic acids, which undergoes decomposition at elevated temperature.

In addition the polyurethane adhesive can contain additional constituents such as are known to the person skilled in the art from two-component polyurethane chemistry. These can be present in only one component or in both. Such additional components, in particular, may involve solvents, plasticizers and/or extenders, fillers such as in particular carbon blacks, chalks or phyllosilicates, in addition to pigments, rheology-modifying agents such as in particular amorphous silicas, drying agents such as in particular zeolites, adhesive promoters such as in particular trialkoxysilanes, stabilizers against oxidation, heat, light and UV radiation, flame-inhibiting substances, and surface-active substances, especially wetting agents.

The polyol component K1 and the polyisocyanate component K2 are advantageously formulated such that their mixing ratio by volume falls in the range of 1:3 to 3:1, in particular 1:2 to 2:1. Particularly preferably it is in the range of 0.8:1.2.

The mixing ratio between the components K1 and K2 is preferably such that in the mixed polyurethane adhesive the ratio between the number of isocyanate groups and the number of groups reactive toward isocyanates, in particular the total of OH and $NH_2$ groups, before curing is approximately in the range of 1.2 to 1, preferably 1.15 to 1.05.

The two components K1 and K2 are prepared separately from one another, and at least for the polyisocyanate component K2, under exclusion of moisture. The components K1 and K2 are typically each stored in its own container. The additional constituents of the polyurethane adhesives can be present as constituents of the polyol component K1 or the polyisocyanate component K2, wherein additional constituents reactive toward isocyanate groups are preferably a constituent of the polyol component K1. A suitable container for storing the respective component is in particular a drum, a hobbock, a bag, a bucket, a canister, a cartridge or a tube. Both of the components K1 and K2 have good shelf life, in other words, they can be stored for several months to one year and longer before use without their respective properties changing to an extent that would be significant for their use.

The polyol component K1 and the polyisocyanate component K2 are stored separately from one another before the adhesive is used and are only mixed together during or immediately before use. They are advantageously present in one package which consists of two chambers separated from one another.

In an additional aspect, the invention comprises a packaging consisting of an outer packaging having two separate chambers respectively containing the polyol component K1 and the polyisocyanate component K2 of the polyurethane adhesive, respectively.

Preferred packagings of this type are on one hand side-by-side double cartridges or coaxial cartridges, in which two tubular chambers are arranged side by side or one inside the other and are closed air- and moisture-tight with pistons. The components can be forced out of the cartridges by advancing these pistons. The sides of the tubes opposite the pistons are modified, optionally using an adapter, such that the chamber openings in the area of the opening are directly connected with one another via a partition. Advantageously a screw thread is supplied in the area of the outlet opening of the chambers, so that a static mixer or a dynamic mixer can be connected airtight to this. Packagings of this type are preferred for small applications, especially for capacities of up to 1 liter.

For larger-scale applications, in particular for applications in industrial fabrication, the two components are advantageously filled into drums or hobbocks and stored. For use, the components are squeezed out using feed pumps and fed through pipelines to a mixing apparatus such as is usually used for two-component adhesives in industrial fabrication.

The mixing typically takes place via static mixers or with the aid of dynamic mixers. When mixing it is important to make sure that the polyol component K1 and the polyisocyanate component K2 are mixed together as homogeneously as possible. If the die two components are not well mixed, local deviations from the advantageous mixing ratio occur, which can result in deterioration of the mechanical properties. To visually check the mixing quality it may be advantageous if the two components have two different colors. Good mixing has thus taken place when the mixed adhesive has a homogeneous mixed color without visible streaks or striations.

Upon contact of the polyol component K1 with isocyanate groups of the polyisocyanate component K2, curing by chemical reaction begins. In this process the amino groups of the polyamine PA and the hydroxy groups of the triol A1, the diol A2 and the diol A3 and any additional substances reactive toward isocyanate groups that may be present react with isocyanate groups that are present. Excess isocyanate groups react with moisture that is present. As a result of these reactions, the polyurethane adhesive cures to a solid material. This process is also designated as crosslinking.

Thus an additional subject of the invention is a cured polyurethane adhesive, obtained by curing a polyurethane adhesive as described in the present document.

An additional aspect of the present invention relates to a method for bonding a first substrate with a second substrate, which comprises the steps of:
  mixing the above-described polyol component K1 and polyisocyanate component K2,
  applying the mixed polyurethane adhesive to at least one substrate surface to be bonded,
  fitting the substrates to be bonded together within the open time,
  curing the polyurethane adhesive.

The two substrates may consist of the same or different materials.

Suitable substrates in this method of bonding are in particular
  glass, glass ceramic, glass-mineral fiber mats;
  metals and alloys, such as aluminum, iron, steel and nonferrous metals, as well as surface-enhanced metals and alloys, such as zinc- or chromium-plated metals;
  coated and lacquered substrates, such as powder-coated metals or alloys and lacquered metal sheets;
  plastics, such as polyvinyl chloride (hard and soft PVC), acrylonitrile-butadiene-styrene copolymers (ABS), polycarbonate (PC), polyamide (PA), poly(methyl methacrylate) (PMMA), polyester, epoxy resins, especially epoxy-based thermosets, polyurethanes (PUR), polyoxymethylene (POM), polyolefins (PO), polyethylene (PE) or polypropylene (PP), ethylene/propylene-copolymers (EPM) and ethylene/propylene/diene terpolymers (EPDM), wherein the plastics can preferably be surface-treated with plasma, corona or flames;
  fiber-reinforced plastics, such as carbon fiber-reinforced plastics (CFR), glass fiber-reinforced plastics (GFR) and sheet molding compounds (SMC);
  wood, wooden materials bonded with resins, for example phenol, melamine or epoxy resins, resin-textile composite materials and other so-called polymer composites; and
  concrete, mortar, tile, gypsum and natural rocks such as granite, limestone, sandstone or marble.

In this method, one or both substrate(s) is/are preferably a metal or a glass ceramic or a glass or a glass fiber-reinforced plastic or a carbon fiber-reinforced plastic or an epoxy-based thermoset.

If necessary, the substrates can be pretreated before applying the adhesive. Such pretreatments comprise in particular physical and/or chemical cleaning methods as well as application of a bonding agent, a bonding agent solution or a primer.

In addition it can be advantageous if the method incorporates an additional step after the step of curing the polyurethane adhesive, this step being
  heating the cured polyurethane adhesive to release the bond.

Advantageously the heating is performed at a temperature of $\geq 120°$ C., in particular $140°$ C.-$200°$ C., especially preferably of $150$-$160°$ C. for a time of $\geq 10$ min, in particular $\geq 20$ min, particularly preferably of 20-40 min, most preferably of 20-40 min.

The heating is performed in particular using an infrared radiator, a hot-air blower, an induction heater or in an oven.

The heating leads to at least partial destruction of the cured polyurethane adhesive. After heating, the bond can be easily undone by separating the bonded substrates from one another or by separating the bonded substrates from the previously heated, cured polyurethane adhesive, typically with little application of force per bonding surface, for example a force of less than 2.0 MPa, in particular with 1.5-0.2 MPa.

This is especially advantageous in the case of repair of a bonded workpiece, since in this way, by heating the cured polyurethane adhesive, damaged or incorrectly bonded substrates can be readily replaced in a controlled manner. For example, in the case of a vehicle on which the parts are bonded together using an adhesive according to the invention, the bonding sites of the individual bonded parts can be heated in a controlled manner, for example with a hot-air blower or using IR lamps or, in the case of metal parts, by induction. In this way individual bonded parts can be removed from the vehicle by releasing the bond by heating, without the bonds on the other bonded parts being impacted. Since this can be accomplished without application of large forces, the other molded parts also are not damaged.

Thus in an additional aspect, the invention relates to a method for thermally-induced release of adhesion by controlled thermal degradation of the adhesive by applying a temperature of 120° C.-200° C. for 10-50 min, preferably by applying a temperature of 150° C.-160° C. for 20-40 min and release of a previously described polyurethane adhesive.

The bonding method described results in an article in which the adhesive, links two substrates with one another.

This article is in particular a sandwich element of a lightweight structure, a building, for example a bridge, an industrial commodity or a consumer commodity, in particular a window, a rotor blade of a wind power plant or a transport means, in particular a vehicle, preferably an automobile, a bus, a truck, a rail vehicle or a ship, as well as an airplane or a helicopter, or a an attachment part for such an article.

Particularly preferably the polyurethane adhesive according to the invention is used for bonding a first substrate with a second substrate, wherein at least the first substrate is a glass fiber-reinforced plastic or a carbon fiber-reinforced plastic or an epoxy-based thermoset or a glass-mineral fiber mat.

Bonds of this type are, in particular, constituents of so-called lightweight vehicles, thus vehicles in which the body is made at least partially of glass fiber-reinforced plastic or carbon-fiber reinforced plastic. In these instances the second substrate can in particular be a glass fiber-reinforced plastic, a carbon fiber-reinforced plastic, a steel, a cathodic dip-coated steel, an aluminum or a plastic.

Such bonds are also in particular a constituent of sandwich elements for so-called light-weight construction items, which may be mobile or stationary. Here the first substrate in particular is a glass-mineral fiber mat.

The polyurethane adhesive described has very good properties as a structural adhesive.

A structural adhesive is defined here as an adhesive which in the cured state forms part of the supporting structure of the bonded structural element. The structural adhesive is thus an important connector for construction, within which it links two elements or substrates. Correspondingly high requirements are imposed on its mechanical properties.

Another important characteristic of a structural adhesive is its good processability. In this context the two components, individually and when mixed, should have a low viscosity, so that they can be conveyed and mixed well, but then rapidly build up a viscosity such that a structurally viscous, stable material is obtained, so that layer thicknesses of up to 10 millimeters or more can be applied in a dimensionally stable manner.

The requirements can be met especially readily with the polyurethane adhesive described.

EXAMPLES

Substances Used

| | |
|---|---|
| Polyisocyanate | Modified diphenylmethane diisocyanate containing MDI-carbodiimide adducts, liquid at room temperature, NCO content 29.4 wt.-% (Isonate ® M 143 from Dow) |
| Triol | EO-endcapped polyoxypropylene triol, OH number 35.0 mg KOH/g (Voranol ® CP 4755 from Dow) |
| 1,4-Butanediol | 1,4-Butanediol from lyondellbasell |
| Diol-1 | Poly(trimethylene oxide) diol, average molar mass ca. 2,400 g/mol, OH number 42 mg KOH/g (Cerenol ™ H2400 from DuPont) |
| Diol-2 | Poly(tetramethylene oxide) diol, average molar mass ca. 2,000 g/mol, OH number 56 mg KOH/g (PolyTHF ® 2000 from BASF) |
| MXDA | 1,3-Bis-(aminomethyl)benzene |
| DABCO | 1,4-Diazabicyclo[2.2.2]octane, 33.0 wt.-% in dipropylene glycol (DABCO 33 LV ® from Air Products) |
| Zeolite | Sylosiv ® A3 from Grace |
| Talc | Glomaxx LL from Imerys |
| Silica | Hydrophobically modified fumed silica |

Polymer-1 was produced by reacting 1,300 g of polyoxypropylene diol (Acclaim® 4200 N from Bayer; OH number 28.5 mg KOH/g), 2,600 g of polyoxypropylene-polyoxyethylene triol (Caradol® MD34-02 from Shell; OH number 35.0 mg KOH/g), 600 g of 4,4'-methylene diphenyl diisocyanate (Desmodur® 44 MC L from Bayer) and 500 g of diisodecyl phthalate by known methods at 80° C. to form a NCO-terminated polyurethane polymer with a free isocyanate group content of 2.1 wt.-%.

Preparation of Polyurethane Adhesives

For each adhesive the constituents shown in Table 1 in the indicated quantities (in parts by weight) of the polyol component K1 were processed using a vacuum dissolver under exclusion of moisture into a homogeneous paste and stored. Similarly the constituents of the polyisocyanate component K2 listed in Table 1 were processed and stored. Then the two components were processed in the indicated mixing ratio K2/K1 (in parts by weight, w/w) using a SpeedMixer® (DAC 150 FV, Hauschild) for 30 seconds to form a homogeneous paste and this was tested immediately thereafter as follows:

For determining the mechanical properties the adhesive was made into a dumbbell shape according to ISO 527, Part 2, 1B, and stored and cured, respectively, for 24 h at 25° C. and subsequently for 3 h at 80° C.

After a conditioning period of 24 h at the temperature given in Table 2 (−35° C. or 23° C. or 85° C.) the modulus of elasticity in the range of 0.05 to 0.25% elongation ("modulus of elasticity"), the tensile strength and the elongation at break of other test pieces produced in this way were measured according to ISO 527 on a Zwick Z020 tensile testing machine at the respective temperatures given in the table and a test speed of 50 mm/min.

For measuring the tensile shear strength, various test pieces were produced, wherein in each case the adhesive was applied in a layer thickness of 2 mm between two CDP-painted steel plates degreased with isopropanol on an overlapping bond surface of 15×45 mm in each case 1 minute after the mixing time. The tensile shear strength was determined on these test pieces according to DIN EN 1465, wherein the test pieces were stored differently before the measurement: either, as a measure of the early strength, for 1 h at 23° C. or for 3 h at 23° C. and measured at 23° C.; or, for measuring the tensile shear strength in the fully cured state, for 12 h at 23° C. and then for 3 h at 80° C. and then for 24 h at −35° C. or 23° C. or 85° C., measured at −35° C. or 23° C. or 85° C. These measurements in the fully cured state are designated as "cured" in Table 2. The labels (af), (cf) and (acf) designate the respective fracture patterns, wherein "af" represents an adhesive fracture pattern, "cf" represents a cohesive fracture pattern and "acf" represents a mixed adhesive and cohesive fracture pattern.

The results are presented in Table 2.

The labels (A1+A3)/A2 and A1/A3 in Table 1 relate to the weight ratios of the triols A1, diols A2 and diols A3 present in the respective adhesive.

Rf.1 is a comparison example and Z-1 to Z-10 are example according to the invention.

TABLE 1

| | Examples | | | | | | | | | | |
|---|---|---|---|---|---|---|---|---|---|---|---|
| | Rf. 1 | Z-1 | Z-2 | Z-3 | Z-4 | Z-5 | Z-6 | Z-7 | Z-8 | Z-9 | Z-10 |
| Polyol component K1: | | | | | | | | | | | |
| Triol | 52.2 | 52.0 | 50.0 | 48.0 | 52.0 | 43.0 | 52.0 | 50.0 | 48.0 | 52.0 | 43.0 |
| 1,4-Butanediol | 7.4 | 7.5 | 7.5 | 7.5 | 5.0 | 7.5 | 7.5 | 7.5 | 7.5 | 5.0 | 7.5 |
| Diol-1 | — | 1.0 | 3.0 | 5.0 | 5.0 | 10.0 | — | — | — | — | — |
| Diol-2 | — | — | — | — | — | — | 1.0 | 3.0 | 5.0 | 5.0 | 10.0 |
| MXDA | 2.0 | 1.8 | 1.8 | 1.8 | 1.8 | 1.8 | 1.8 | 1.8 | 1.8 | 1.8 | 1.8 |
| DABCO | 0.2 | 0.2 | 0.2 | 0.2 | 0.2 | 0.2 | 0.2 | 0.2 | 0.2 | 0.2 | 0.2 |
| Talc | 33.3 | 33.5 | 33.5 | 33.5 | 32.0 | 33.5 | 33.5 | 33.5 | 33.5 | 32.0 | 33.5 |
| Zeolite | 4.9 | 4.0 | 4.0 | 4.0 | 4.0 | 4.0 | 4.0 | 4.0 | 4.0 | 4.0 | 4.0 |
| (A1 + A3)/A2 | 7.1 | 7.1 | 7.1 | 7.1 | 11.4 | 7.1 | 7.1 | 7.1 | 7.1 | 11.4 | 7.1 |
| A1/A3 | — | 52 | 16.7 | 9.6 | 10.4 | 4.3 | 52 | 16.7 | 9.6 | 10.4 | 4.3 |
| Polyisocyanate component K2: | | | | | | | | | | | |
| Polyisocyanate | 39.5 | 39.5 | 39.5 | 39.5 | 39.5 | 39.5 | 39.5 | 39.5 | 39.5 | 39.5 | 39.5 |
| Polymer-1 | 56.5 | 56.5 | 56.5 | 56.5 | 56.5 | 56.5 | 56.5 | 56.5 | 56.5 | 56.5 | 56.5 |
| Silica | 4.0 | 4.0 | 4.0 | 4.0 | 4.0 | 4.0 | 4.0 | 4.0 | 4.0 | 4.0 | 4.0 |
| K2/K1 (w/w) | 0.84 | 0.84 | 0.84 | 0.84 | 0.64 | 0.85 | 0.84 | 0.84 | 0.85 | 0.64 | 0.85 |

TABLE 2

| | Examples | | | | | | | | | | |
|---|---|---|---|---|---|---|---|---|---|---|---|
| | Rf. 1 | Z-1 | Z-2 | Z-3 | Z-4 | Z-5 | Z-6 | Z-7 | Z-8 | Z-9 | Z-10 |
| Modulus of elasticity [MPa] | | | | | | | | | | | |
| −35° C. | 196 | 166 | 117 | 146 | 80 | 85 | 186 | 244 | 178 | 118 | 194 |
| 23° C. | 52 | 35 | 34 | 36 | 23 | 33 | 50 | 56 | 50 | 25 | 46 |
| 85° C. | 21 | 23 | 20 | 21 | 14 | 21 | 27 | 23 | 25 | 17 | 28 |
| Tensile strength [MPa] | | | | | | | | | | | |
| −35° C. | 34 | 28 | 25 | 30 | 34 | 25 | 35 | 38 | 37 | 36 | 36 |
| 23° C. | 13 | 10 | 11 | 10 | 10 | 11 | 13 | 13 | 13 | 11 | 12 |
| 85° C. | 6 | 6 | 6 | 7 | 6 | 7 | 6 | 7 | 7 | 6 | 6 |
| Elongation at break [%] | | | | | | | | | | | |
| −35° C. | 233 | 191 | 210 | 210 | 249 | 230 | 170 | 162 | 191 | 256 | 206 |
| 23° C. | 234 | 200 | 208 | 203 | 212 | 228 | 194 | 196 | 182 | 199 | 183 |
| 85° C. | 98 | 98 | 116 | 127 | 106 | 125 | 85 | 96 | 95 | 93 | 100 |
| Tensile shear strength [MPa] | | | | | | | | | | | |
| 1 h 23° C. | 0.4 (af) | 0.9 (acf) | 0.6 (acf) | 0.5 (af) | 2.0 (cf) | 0.5 (af) | 1.2 (cf) | 1.0 (acf) | 0.6 (acf) | 0.7 (acf) | 1.0 (cf) |
| 3 h 23° C. | 2.7 (cf) | 3.6 (cf) | 3.5 (cf) | 3.0 (cf) | 4.7 (cf) | 2.8 (cf) | 3.5 (cf) | 4.2 (cf) | 3.2 (cf) | 2.8 (acf) | 3.1 (cf) |
| cured, −35° C. | 13.6 | 14.0 | 14.0 | 13.9 | 14.6 | 13.7 | 13.5 | 13.6 | 13.8 | 13.9 | 13.9 |
| cured, 23° C. | 9.6 | 10.0 | 9.8 | 9.7 | 8.4 | 9.2 | 9.6 | 9.8 | 9.7 | 8.2 | 9.3 |
| cured, 85° C. | 4.4 | 4.3 | 4.3 | 4.0 | 3.3 | 4.2 | 4.1 | 4.1 | 4.2 | 3.8 | 4.0 |

Figure 2:
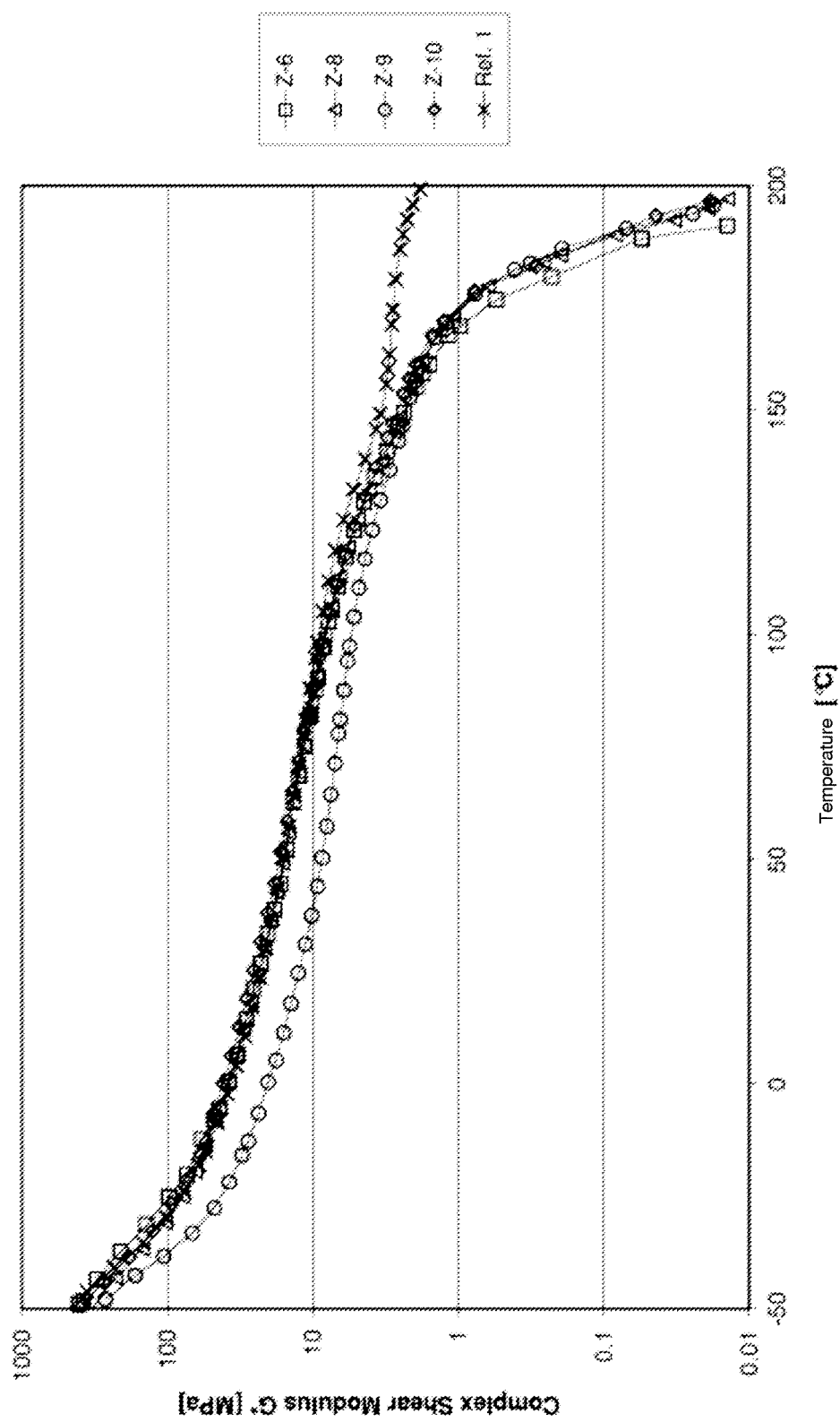

The DMTA measurements shown in FIGS. 1 and 2, were performed with a Mettler DMA/SDTA 861e. The measurement conditions were: measurement in shear, 10 Hz excitation frequency and 5 K/min heating rate. Test pieces used were disk-shaped specimens (thickness 2-3 mm, diameter 10 mm) of films cured for 7 days in standard climate (23° C., 50% relative humidity). These were cooled to −60° C. and then heated at a heating rate of 5K/min to 200° C. and the complex shear modulus G* [MPa] was determined.

The invention claimed is:

1. A polyurethane adhesive comprising a polyol component K1 and a polyisocyanate component K2; wherein:
the polyol component K1 comprises:
at least one triol A1 with an average molar mass in a range of 1,000 to 10,000 g/mol;
at least one diol A2 having two primary hydroxy groups and a molar mass in a range of 60 to 150 g/mol;
at least one diol A3 with an average molar mass in a range of 200 to 3000 g/mol, which is either a poly(trimethylene oxide) diol or a poly(tetramethylene oxide) diol, and
at least one aliphatic polyamine PA with a molar mass in a range of 60 to 500 g/mol; and
the polyisocyanate component K2 comprises:
at least one polyisocyanate B1; and
at least one isocyanate group-containing polyurethane polymer B2 different from polyisocyanate B1 and obtained by reacting at least one polyisocyanate with at least one polyol;
wherein the triol A1, the diol A2 and the diol A3 are present in such a quantity that a weight ratio of (A1+A3)/A2 is in a range of 2.5:1 to 20:1, and a weight ratio of A1/A3 is in a range of 2:1 to 100:1.

2. The polyurethane adhesive according to claim 1, wherein the triol A1 is a polyether triol.

3. The polyurethane adhesive according to claim 1, wherein the triol A1 has primary hydroxy groups.

4. The polyurethane adhesive according to claim 1, wherein the triol A1 has an average molar mass in a range of 3,000 to 8,000 g/mol.

5. The polyurethane adhesive according to claim 1, wherein the diol A3 is a poly(trimethylene oxide) diol.

6. The polyurethane adhesive according to claim 1, wherein the diol A3 is a poly(tetramethylene oxide) diol.

7. The polyurethane adhesive according to claim 1, wherein the polyamine PA is selected from the group consisting of:
1,5-diamino-2-methylpentane, 2,2,4- and 2,4,4-trimethylhexamethylene diamine, 1,8-octanediamine, 1,10-decanediamine, 1,12-dodecane diamine, 1-amino-3-aminomethyl-3,5,5-trimethylcyclohexane, 2- and 4-methyl-1,3-diaminocyclohexane and mixtures thereof, 1,3-bis-(aminomethyl)cyclohexane, 1,4-bis-(aminomethyl)cyclohexane, 2,5(2,6)-bis-(aminomethyl)-bicyclo[2.2.1]heptane, 3(4),8(9)-bis-(aminomethyl)-tricyclo[5.2.1.0$^{2,6}$]decane, bis-(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 1,3-bis-(aminomethyl)benzene and 1,4-bis-(aminomethyl)benzene.

8. The polyurethane adhesive according to claim 1, wherein the polyisocyanate B1 is liquid at room temperature and is any liquid mixture of 4,4'-, 2,4'- and/or 2,2'-diphenylmethane diisocyanate (MDI) or a polymeric MDI.

9. The polyurethane adhesive according to claim 1, wherein the isocyanate group-containing polyurethane polymer B2 is configured as a reaction of 4,4'-diphenylmethane diisocyanate with at least one polyol.

10. The polyurethane adhesive according to claim 1, wherein a mixing ratio in volumes between the polyol component K1 and the polyisocyanate component K2 is in a range of 1:3 to 3:1.

11. A method for bonding a first substrate to a second substrate, comprising:
applying the polyurethane adhesive according to claim 1 to at least one substrate surface to be bonded;
fitting substrates to be bonded together within an open time; and
curing the polyurethane adhesive.

12. The method according to claim 11, wherein one or both substrate(s) is/are a metal or a glass ceramic or a glass or a glass fiber-reinforced plastic or a carbon fiber-reinforced plastic or a thermoset derived from an epoxy compound.

13. An article formed from the method of bonding according to claim 11.

14. A method for thermally-induced release of adhesion by thermal degradation comprising:
heating a cured polyurethane adhesive to a temperature of 120° C.-200° C. for 10-50 min; and
releasing the cured polyurethane adhesive, wherein the cured polyurethane adhesive prior to curing is according to claim 1.

15. A method for bonding a first substrate to a second substrate, wherein at least the first substrate is a glass fiber-reinforced plastic or a carbon fiber-reinforced plastic or a thermoset derived from an epoxy compound or a glass-mineral fiber mat, the method including:
bonding the first substrate and the second substrate with a polyurethane adhesive according to claim 1.

16. The polyurethane adhesive according to claim 1, wherein the weight ratio of (A1+A3)/A2 is in a range of 3:1 to 15:1, and the weight ratio of A1/A3 is in a range of 3:1 to 75:1.

17. The polyurethane adhesive according to claim 1, wherein the weight ratio of (A1+A3)/A2 is in a range of 4:1 to 10:1, and the weight ratio of A1/A3 is in a range of 4:1 to 50:1.

18. The polyurethane adhesive according to claim 1, wherein a mixing ratio in volumes between the polyol component K1 and the polyisocyanate component K2 is in a range of 1:2 to 2:1.

19. The polyurethane adhesive according to claim 2, wherein the diol A3 is a poly(trimethylene oxide) diol.

20. The polyurethane adhesive according to claim 19, wherein the polyamine PA is selected from the group consisting of:
1,5-diamino-2-methylpentane, 2,2,4- and 2,4,4-trimethylhexamethylene diamine, 1,8-octanediamine, 1,10-decanediamine, 1,12-dodecane diamine, 1-amino-3-aminomethyl-3,5,5-trimethylcyclohexane, 2- and 4-methyl-1,3-diaminocyclohexane and mixtures thereof, 1,3-bis-(aminomethyl)cyclohexane, 1,4-bis-(aminomethyl)cyclohexane, 2,5(2,6)-bis-(aminomethyl)-bicyclo[2.2.1]heptane, 3(4),8(9)-bis-(aminomethyl)-tricyclo[5.2.1.0$^{2,6}$]decane, bis-(2-aminoethyl) ether, 3,6-dioxaoctane-1,8-diamine, 4,7-dioxadecane-1,10-diamine, 4,7-dioxadecane-2,9-diamine, 4,9-dioxadodecane-1,12-diamine, 5,8-dioxadodecane-3,10-diamine, 1,3-bis-(aminomethyl)benzene and 1,4-bis-(aminomethyl)benzene.

21. A package containing two chambers separated from one another, one chamber comprising a polyol component K1 and the other chamber comprising a polyisocyanate component K2, wherein the polyol component K1 comprises:

at least one triol A1 with an average molar mass in a range of 1,000 to 10,000 g/mol;

at least one diol A2 having two primary hydroxy groups and a molar mass in a range of 60 to 150 g/mol;

at least one diol A3 with an average molar mass in a range of 200 to 3000 g/mol, which is either a poly(trimethylene oxide) diol or a poly(tetramethylene oxide) diol, and at least one aliphatic polyamine PA with a molar mass in a range of 60 to 500 g/mol; and the polyisocyanate component K2 comprises:

at least one polyisocyanate B1; and at least one isocyanate group-containing polyurethane polymer B2 different from polyisocyanate B1 and obtained by reacting at least one polyisocyanate with at least one polyol;

wherein the triol A1, the diol A2 and the diol A3 are present in such a quantity that a weight ratio of (A1+A3)/A2 is in a range of 2.5:1 to 20:1, and a weight ratio of A1/A3 is in a range of 2:1 to 100:1.

22. A method for bonding a first substrate to a second substrate, comprising:

mixing the polyol component K1 and the polyisocyanate component K2 of the package of claim 21 to form a mixed polyurethane adhesive, applying the mixed polyurethane adhesive to at least one substrate surface to be bonded;

fitting substrates to be bonded together within an open time; and curing the polyurethane adhesive.

* * * * *